US011221099B2

(12) United States Patent
Braun et al.

(10) Patent No.: US 11,221,099 B2
(45) Date of Patent: Jan. 11, 2022

(54) STENTS AND METHODS FOR REPAIRING PIPES

(71) Applicant: Mueller International, LLC, Atlanta, GA (US)

(72) Inventors: Clifton Braun, Concord, CA (US); Cody Badger, San Francisco, CA (US); Karl Halden, San Carlos, CA (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 16/836,468

(22) Filed: Mar. 31, 2020

(65) Prior Publication Data

US 2020/0224811 A1    Jul. 16, 2020

Related U.S. Application Data

(63) Continuation of application No. 16/112,207, filed on Aug. 24, 2018, now Pat. No. 10,641,427.

(60) Provisional application No. 62/651,985, filed on Apr. 3, 2018.

(51) Int. Cl.
*F16L 55/163* (2006.01)
(52) U.S. Cl.
CPC .................................. *F16L 55/163* (2013.01)
(58) Field of Classification Search
CPC ............... F16L 2101/60; F16L 55/1653; F16L 55/1645; F16L 55/163; F16L 55/165
USPC ............. 138/97, 98; 405/150.1, 184.1, 153; 156/287; 264/516, 36.16, 269
See application file for complete search history.

(56) References Cited

U.S. PATENT DOCUMENTS

| 3,895,652 | A | | 7/1975 | Zach |
| 4,589,447 | A | | 5/1986 | Kane et al. |
| 4,647,072 | A | * | 3/1987 | Westman ................ B25B 27/02 |
| | | | | 138/97 |
| 5,119,862 | A | | 6/1992 | Maimets et al. |
| 5,351,720 | A | | 10/1994 | Maimets |
| 6,712,556 | B2 | | 3/2004 | Penza |
| 6,820,653 | B1 | | 11/2004 | Schempf et al. |

(Continued)

FOREIGN PATENT DOCUMENTS

| EP | 0621015 | 10/1994 |
| JP | 2005278993 | 10/2005 |

(Continued)

OTHER PUBLICATIONS

US 11,035,513 B2, 06/2021, Furcoiu (withdrawn)

(Continued)

*Primary Examiner* — Patrick F Brinson
(74) *Attorney, Agent, or Firm* — Taylor English Duma LLP

(57) ABSTRACT

Example aspects of a stent for repairing a pipe and a method for repairing a pipe are disclosed. The stent for repairing a pipe can comprise a spring comprising a metal wire and defining a tubular structure, the spring defining an outer surface and an inner surface, the inner surface defining a void, an axis extending through the void; and a sealing layer defining a sleeve, the sealing layer wrapped around a circumference of the spring and engaging the outer surface of the spring; the stent configurable in a compressed configuration, wherein the spring is compressed, and an expanded configuration, wherein the spring is expanded

21 Claims, 5 Drawing Sheets

(56) References Cited

U.S. PATENT DOCUMENTS

| | | | |
|---|---|---|---|
| 7,025,580 | B2 | 4/2006 | Heagy et al. |
| 7,172,370 | B2 | 2/2007 | Schmidt |
| 7,267,141 | B1 | 9/2007 | De Meyer et al. |
| 8,488,290 | B2 | 7/2013 | Kauffman |
| 8,783,297 | B2 | 7/2014 | Hawwa et al. |
| 9,052,051 | B2 * | 6/2015 | Maimets .............. F16L 55/163 |
| 10,641,427 | B2 | 5/2020 | Braun et al. |
| 11,079,058 | B2 | 8/2021 | Furcoiu |
| 2002/0144822 | A1 | 10/2002 | Hackworth et al. |
| 2003/0017775 | A1 ‡ | 1/2003 | Sowinski et al. ....... A61L 27/16 442/31 |
| 2003/0233140 | A1 | 12/2003 | Hartley et al. |
| 2004/0236398 | A1 | 11/2004 | Burgmeier et al. |
| 2008/0140178 | A1 | 6/2008 | Rasmussen et al. |
| 2008/0255660 | A1 ‡ | 10/2008 | Guyenot et al. ...... A61F 2/2418 623/2 |
| 2008/0269789 | A1 | 10/2008 | Eli |
| 2010/0010617 | A1 | 1/2010 | Goodson, IV et al. |
| 2010/0049313 | A1 | 2/2010 | Alon et al. |
| 2011/0264186 | A1 | 10/2011 | Berglung et al. |
| 2012/0273078 | A1 | 11/2012 | Hawwa et al. |
| 2013/0018450 | A1 ‡ | 1/2013 | Hunt ....................... A61F 2/844 623/1 |
| 2013/0131783 | A1 | 5/2013 | Shalev et al. |
| 2013/0158646 | A1 | 6/2013 | Roeder |
| 2016/0120638 | A1 ‡ | 5/2016 | Michalak .................. A61F 2/89 623/1 |
| 2016/0143732 | A1 | 5/2016 | Glimsdale |
| 2016/0238178 | A1 * | 8/2016 | Urbanski ............ F16L 55/1654 |
| 2017/0231765 | A1 | 8/2017 | Desrosiers et al. |
| 2017/0304092 | A1 ‡ | 10/2017 | Hong et al. .......... A61M 1/3655 |
| 2019/0093813 | A1 | 3/2019 | Badger et al. |
| 2019/0301657 | A1 | 10/2019 | Braun et al. |
| 2020/0263823 | A1 | 8/2020 | Furcoiu |
| 2020/0292119 | A1 | 9/2020 | Furcoiu |
| 2020/0292120 | A1 | 9/2020 | Furcoiu |
| 2020/0340610 | A1 | 10/2020 | Furcoiu |
| 2021/0041051 | A1 | 2/2021 | Furcoiu |
| 2021/0041052 | A1 | 2/2021 | Furcoiu |

FOREIGN PATENT DOCUMENTS

| | | |
|---|---|---|
| KR | 1020070018627 | 2/2007 |
| WO | 2011001189 | 1/2011 |
| WO | 2019194870 | 10/2019 |
| WO | WO-2019194870 ‡ | 10/2019 |
| WO | 2020172136 | 8/2020 |
| WO | 2020219294 | 10/2020 |

OTHER PUBLICATIONS

Braun, Clifton; International Preliminary Report on Patentability for PCT Application No. PCT/US18/63325, filed Nov. 30, 2018, dated Oct. 15, 2020, 7 pgs.

Furcoiu, Aurelian Ioan; International Search Report and Written Opinion for PCT Application No. PCT/US20/28038, filed Apr. 14, 2020, dated Jun. 24, 2020, 9 pgs.

Furcoiu, Aurelian Ioan; Requirement for Restriction/Election for U.S. Appl. No. 17/792,984, filed Feb. 18, 2020, dated Apr. 1, 2021, 6 pgs.

Furcoiu, Aurelian Ioan; Non-Final Office Action for U.S. Appl. No. 16/786,193, filed Feb. 10, 2020, dated Feb. 4, 2021, 22 pgs.

Furcoiu, Aurelian Ioan; Non-Final Office Action for U.S. Appl. No. 16/786,246, filed Feb. 10, 2020, dated Mar. 4, 2021, 21 pgs.

Furcoiu, Aurelian Ioan; Requirement for Restriction/Election for U.S. Appl. No. 16/786,246, filed Feb. 10, 2020, dated Feb. 3, 2021, 6 pgs.

Braun, Clifton; Non-Final Office Action for U.S. Appl. No. 16/112,207, filed Aug. 24, 2018, dated Nov. 5, 2019, 14 pgs.

Braun, Clifton; Notice of Allowance for U.S. Appl. No. 16/112,207, filed Aug. 24, 2018, dated Feb. 13, 2020, 13 pgs.

Braun, Clifton; International Search Report for PCT Application No. PCT/US18/63325, filed Nov. 30, 2018, dated Feb. 5, 2019, 8 pgs.

Furcoiu, Aurelian Ioan; International Search Report and Written Opinion for PCT Application No. PCT/US20/18593, filed Feb. 18, 2020, dated May 7, 2020, 9 pgs.

Furcoiu, Aurelian Ioan; Examiner-Initiated Interview Summary for U.S. Appl. No. 16/845,557, filed Apr. 10, 2020, dated Apr. 21, 2021, 2 pgs.

Furcoiu, Aurelian Ioan; Non-Final Office Action for U.S. Appl. No. 16/792,984, filed Feb. 18, 2020, dated May 25, 2021, 25 pgs.

Furcoiu, Aurelian Ioan; Corrected Notice of Allowance for U.S. Appl. No. 16/786,193, filed Feb. 10, 2020, dated May 17, 2021, 6 pgs.

Furcoiu, Aurelian Ioan; Corrected Notice of Allowance for U.S. Appl. No. 16/786,193, filed Feb. 10, 2020, dated Jun. 22, 2021, 6 pgs.

Furcoiu, Aurelian Ioan; Notice of Allowance for U.S. Appl. No. 16/786,193, filed Feb. 10, 2020, dated Apr. 26, 2021, 9 pgs.

Furcoiu, Aurelian Ioan; Non-Final Office Action for U.S. Appl. No. 16/845,557, filed Apr. 10, 2020, dated Aug. 17, 2021, 35 pgs.

Furcoiu, Aurelian Ioan; Corrected Notice of Allowance for U.S. Appl. No. 16/786,246, filed Feb. 10, 2020, dated Aug. 6, 2021, 7 pgs.

Furcoiu, Aurelian Ioan; Corrected Notice of Allowance for U.S. Appl. No. 16/786,246, filed Feb. 10, 2020, dated Aug. 31, 2021, 6 pgs.

Braun, Cliff; Extended European Search report for application No. 18913510.6, filed Nov. 30, 2018, dated Sep. 13, 2021, 7 pgs.

Furcoiu, Aurelian Ioan; International Prelminary Report on Patentability for PCT Application No. PCT/US20/18593, filed Feb. 18, 2020, dated Sep. 2, 2021, 8 pgs.

* cited by examiner
‡ imported from a related application

STENTS AND METHODS FOR REPAIRING PIPES

RELATED U.S. APPLICATION DATA

This application is a continuation of U.S. application Ser. No. 16/112,207, filed Aug. 24, 2018, which claims the benefit of U.S. Provisional Application No. 62/651,985, filed on Apr. 3, 2018, which is hereby incorporated by reference in its entirety.

TECHNICAL FIELD

This disclosure relates to the field of pipe repair. More specifically, this disclosure relates to a stent for repairing a pipe.

BACKGROUND

Piping systems, including municipal water systems, can develop breaks in pipe walls that can cause leaking. Example of breaks in a pipe wall can include radial cracks, axial cracks, point crack, etc. Repairing a break in a pipe wall often requires the piping system to be shut off, which can be inconvenient for customers and costly for providers. Further, repairs can necessitate grandiose construction, including the digging up of streets, sidewalks, and the like, which can be costly and time-consuming.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a stent comprising a spring, the spring defining an outer surface and an inner surface, the inner surface defining a void; and a seal on the outer surface of the spring; the stent configurable in a compressed orientation, wherein the spring is compressed, and an expanded orientation, wherein the spring is expanded.

Also disclosed is a pipe assembly comprising a pipe comprising an inner wall, the inner wall defining a first void; and a stent comprising a spring and a seal, the stent configurable in a compressed orientation and an expanded orientation, the seal defining an outer surface, the outer surface engaging the inner wall in the expanded configuration.

A method of repairing a pipe is also disclosed, the method comprising compressing a stent, the stent comprising a spring and a seal; inserting the stent into the pipe; positioning the stent proximate a leak in the pipe; and expanding the stent.

A stent for repairing a pipe is disclosed, the stent comprising a spring comprising a metal wire and defining a tubular structure, the spring defining an outer surface and an inner surface, the inner surface defining a void, an axis extending through the void; and a sealing layer defining a sleeve, the sealing layer wrapped around a circumference of the spring and engaging the outer surface of the spring; the stent configurable in a compressed configuration, wherein the spring is compressed, and an expanded configuration, wherein the spring is expanded.

Also disclosed is a method for repairing a pipe comprising providing a stent comprising a spring and a sealing layer, the stent configurable in an expanded configuration and a compressed configuration, wherein an expansion ratio of a diameter of the stent in the expanded configuration to a diameter of the stent in the compressed configuration is between 1.2/1 and 3/1; applying a compression force to the stent to orient the stent in the compressed configuration; navigating the stent to a crack in a pipe; removing the compression force from the stent; expanding the stent to the expanded configuration within the pipe; and engaging an outer surface of the sealing layer with an inner wall of the pipe Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
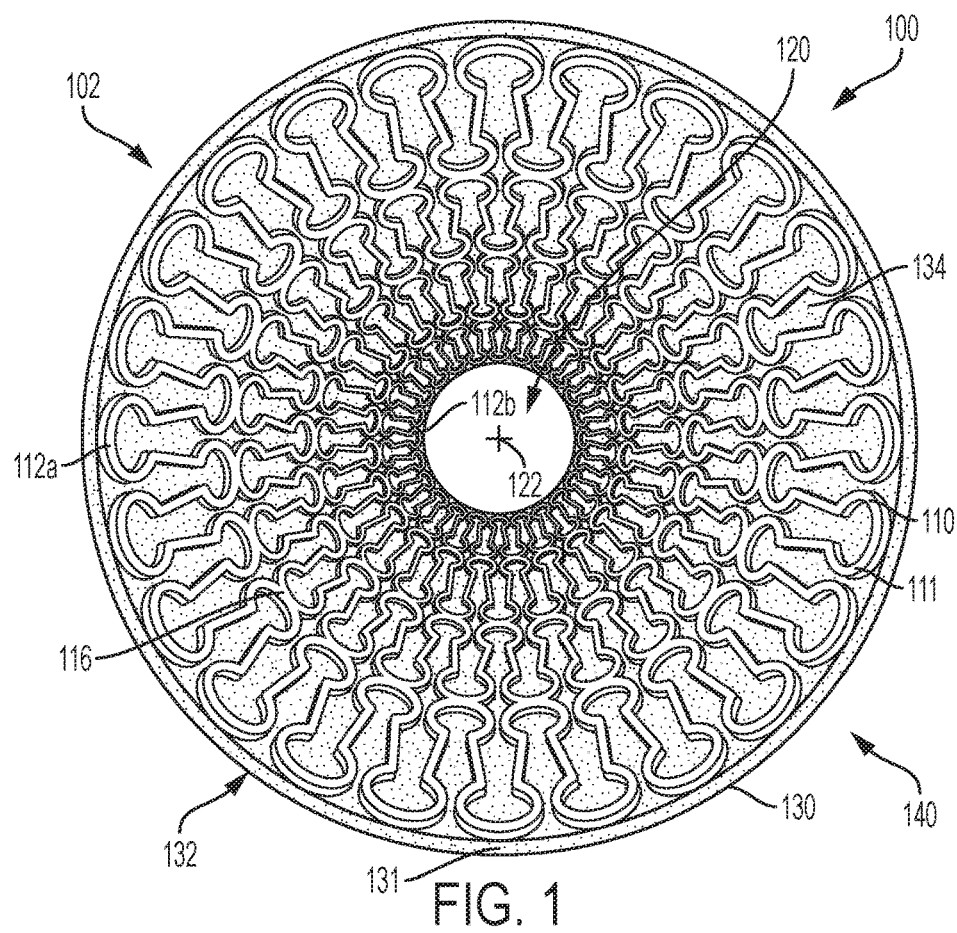
FIG. 1 is an end view of a first aspect of a stent comprising a spring and a seal, according to the present disclosure, wherein the stent is in an expanded configuration.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a stent for repairing a pipe and associated methods, systems, devices, and various apparatus. Example aspects of the stent can comprise a spring and a sealing layer. It would be understood by one of skill in the art that the disclosed stent is described in but a few exemplary aspects among many. No particular terminology or description should be considered limiting on the disclosure or the scope of any claims issuing therefrom.

Figure 2:
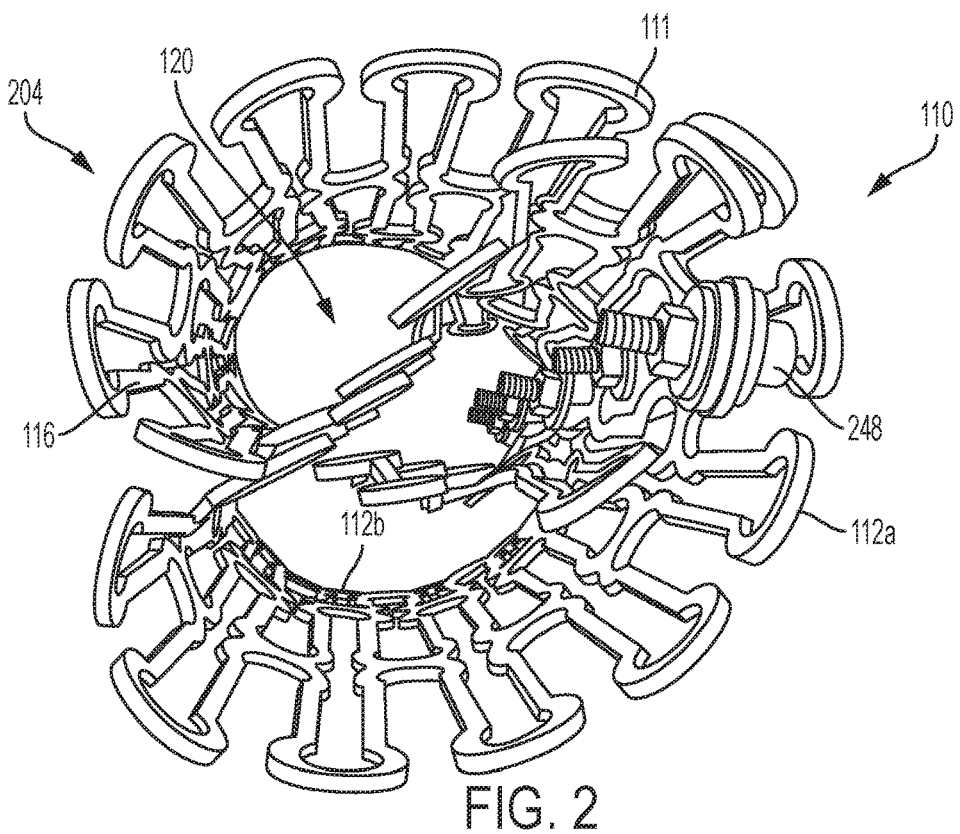
FIG. 2 is an end view of the spring of the stent of FIG. 1 in a compressed configuration.

FIG. 1 illustrates a first aspect of a stent 100, according to the present disclosure. The stent 100 can comprise a spring 110 and a sealing layer 130. Example aspects of the stent 100 can be expandable and compressible, such that the stent 100 can be oriented in an expanded configuration 102, as shown in FIG. 1, and a compressed configuration 204, as shown in FIG. 2. (Note that in FIG. 2, the sealing layer 130 is removed for visibility of the spring 110.) According to example aspects, the stent 100 can be expanded within a pipe 550 (shown in FIG. 5) such that the sealing layer 130 can engage an inner wall 552 of the pipe 550. In a pipe 550 where a crack 554 (shown in FIG. 5) or other damage is present, the sealing layer 130 can create a watertight seal between the stent 100 and the inner surface of the pipe 550 at the location of the damage to prevent leaking at the damage site.

As shown in FIG. 1, the spring 110 can bias the stent 100 to the expanded configuration 102. In the depicted aspect, the spring 110 can be formed as a substantially tubular mesh structure 111 defining opposing open ends 112a,b. The spring 110 can further define an outer surface 314 (best seen in FIG. 3) and an opposite inner surface 116. The inner surface 116 can define an inner diameter of the spring 110 and the outer surface 314 can define an outer diameter of the spring 110. Furthermore, the inner surface 116 can define a void 120 extending between the open ends 112a,b of the spring 110 and an axis 122 extending through a center of the void 120. The opposing open ends 112a,b of the spring 110 can allow for fluid flow through the void 120. Moreover, the spring 110 can define a spring force. In some aspects, the spring 110 can be formed from a plastic material, such as, for example, nylon, POM (polyoxymethylene), or PVC (polyvinyl chloride). In other aspects, the spring 110 can be formed from a metal material, such as stainless steel, spring steel, aluminum, nitinol, cobalt chromium, or any other suitable material. Optionally, the material can be an NSF certified material that can comply with various public health safety standards. For example, in some aspects, the material can be approved as safe for use in drinking-water applications. Furthermore, in some aspects, the spring can comprise a corrosion-resistant coating. In some aspects, instead of the spring 110, the stent can comprise a balloon for biasing the stent 100 from the compressed configuration 204 to the expanded configuration 102, or any other suitable mechanism for expanding the stent 100.

In example aspects, the sealing layer 130 can be formed as a continuous, tubular sleeve structure 131 defining an outer surface 132 and an inner surface 134. The inner surface 134 can define an inner diameter of the sealing layer 130, and the outer surface 132 can define an outer diameter of the sealing layer 130. The outer diameter of the sealing layer 130 can be defined as the diameter of the stent 100 (the "stent diameter"). The inner surface 134 of the sealing layer 130 can engage the outer surface 314 of the spring 110. In some aspects, the sealing layer 130 can wrap around a circumference of the spring 110 and can cover the entire outer surface 314 of the spring 110, as shown. However, in other aspects, such as the aspect of FIG. 5, the sealing layer 130 can wrap around the circumference of the spring 110 and can cover only a portion of the outer surface 314 of the spring 110. In still other aspects, the sealing layer 130 does not wrap around the entire circumference of the spring 110.

Example aspects of the sealing layer 130 can comprise a flexible and compressible material, such as, for example, neoprene. In other aspects, the sealing layer 130 can be formed from another synthetic rubber material such as EPDM rubber, natural rubber, foam, epoxy, silicone, a resin-soaked cloth, or any other suitable flexible material for providing a watertight seat between the stent 100 and the inner wall 552 of the pipe 550 (pipe 550 shown in FIG. 5). According to example aspects, the inner diameter of the sealing layer 130 can substantially match or be slightly smaller than the outer diameter of the spring 110, such that the sealing layer 130 can fit snugly on the spring 110. The sealing layer 130 in some aspects can be coupled to the spring 110 by a fastener (not shown), such as, for example, stitching, adhesives, ties, or any other suitable fastener known in the art.

In the expanded configuration 102, as shown in FIG. 1, the spring force can bias the spring 110 and the sealing layer 130 radially outward relative to the axis 122, such that each of the spring 110 and sealing layer 130 define the relatively tubular shapes, as shown. In the expanded configuration 102, the stent 100 can define its largest possible stent diameter. In the compressed configuration 204, as shown in FIG. 2, a compression force can be applied to the outer surface 132 of the sealing layer 130 by a compression mechanism (not shown). The compression force can overcome the spring force, and the sealing layer 130 and spring 110 can compress or fold radially inward towards the void 120 to define a smaller stent diameter and a smaller overall stent volume than in the expanded configuration 102 (shown in FIG. 1). When the compression force is removed or reduced to less than the spring force, the spring force can bias the stent 100 back to the expanded configuration 102. In other aspects, instead of a compression force, a tension force (i.e., a pulling force) or any other suitable force can be applied the stent 100 to bias the stent 100 to the compressed configuration 204.

An expansion ratio can be defined as the ratio between the stent diameter in the expanded configuration 102 and the stent diameter in the compressed configuration 204. In example aspects, the expansion ratio can be between about 1.2/1 and 3/1. In other aspects, the expansion ratio can be between about 1.4/1 and 2.4/1. In still other aspects, the expansion ratio can be about 2/1. As will be described in further detail below, in the compressed configuration 204, the reduced stent diameter can allow for easier insertion of the stent 100 into a pipeline (not shown) and easier navigation of the stent 100 through the pipeline.

Figure 3:
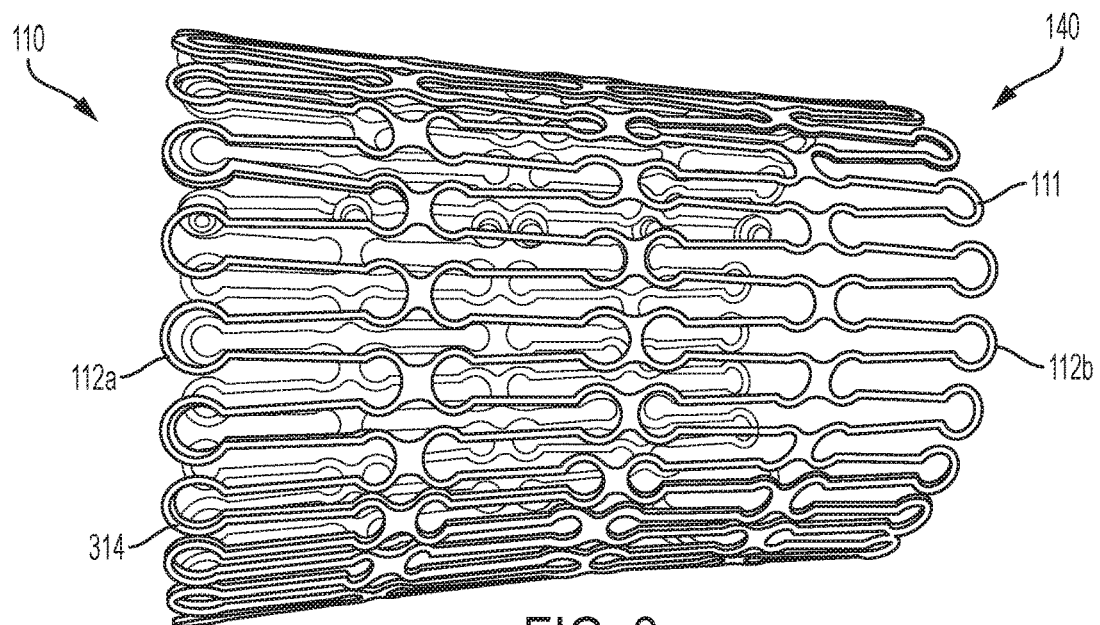
FIG. 3 is a side view of the spring of the stent of FIG. 1 in a rolled configuration.
Figure 4:
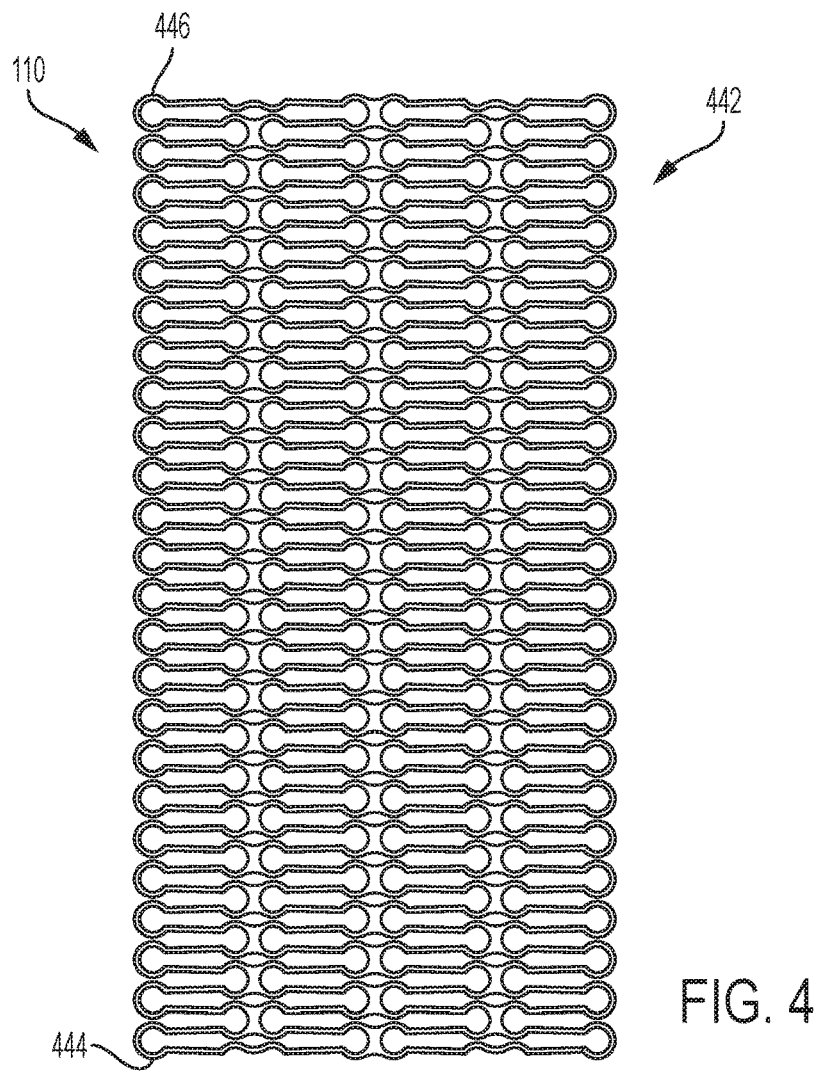
FIG. 4 is a side view of the spring of the stent of FIG. 1 in an unrolled configuration.

Example aspects of the spring 110 can be oriented in a rolled configuration 140 for use, as shown in FIGS. 1-3, and an unrolled configuration 442, as shown in FIG. 4. In example aspects, the spring 110 can be manufactured in the unrolled configuration 442, and rolled into the rolled configuration 140 thereafter for use. Referring to FIG. 4, in the unrolled configuration 442, the spring 110 can be substantially flat and can define a first end 444 and an opposing second end 446. Example aspects of the spring 110 can be rolled into the rolled configuration 140 from the unrolled configuration 442. The first end 444 of the spring 110 can be coupled to the second end 446 to retain the spring 110 in the rolled configuration 140, as shown in FIG. 3. According to example aspects, the first end 444 can be coupled to the second end 446 by a fastener, such as, for example, one or more nut and bolt assemblies 248, as best seen in FIG. 2. In other aspects, the fastener can be adhesives, clips, snaps, ties, or any other suitable fastener or combination of fasteners know in the art.

Figure 5:
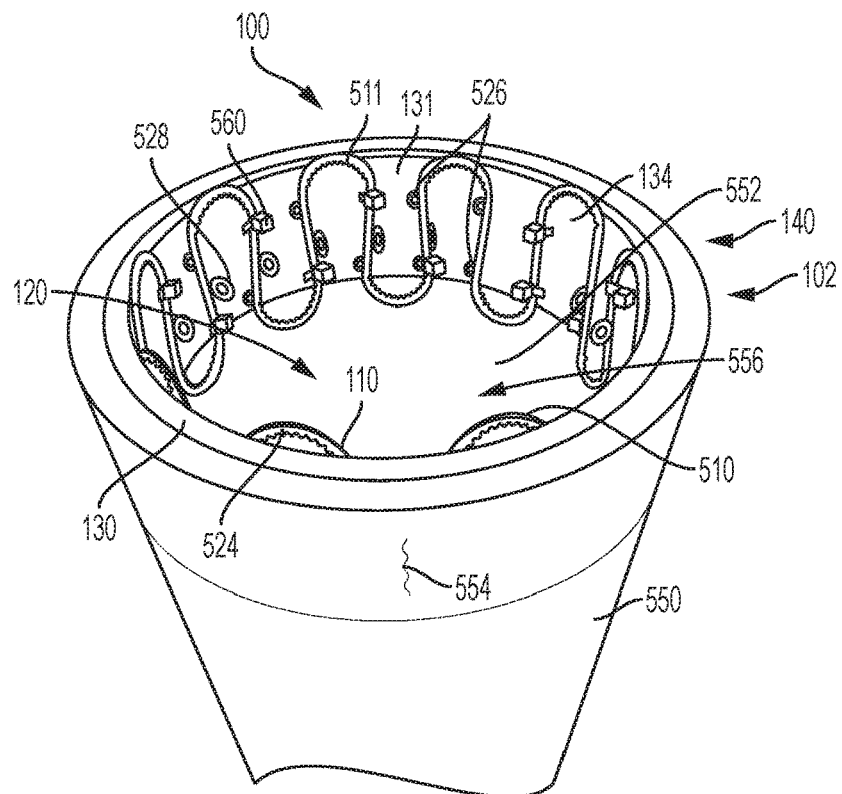
FIG. 5 is a perspective view of another aspect of the stent, according to the present disclosure, with the stent in the expanded configuration within a pipe.

FIG. 5 illustrates the stent 100 according to another aspect of the disclosure, wherein the stent 100 is in the expanded configuration 102 within a void 556 of the pipe 550. The pipe 550 is illustrated as translucent for improved visibility of the stent 100. The void 556 can be defined by the inner wall 552 of the pipe. Like the stent 100 of FIG. 1, the stent 100 of the current aspect comprises the spring 110 and the sealing layer 130. In the present aspect, the spring 110 can be a wave-pattern spring 510. The wave-pattern spring 510 can comprise a metal wire 524 defining a wave pattern in the axial direction. The spring 510 can be rolled into a tubular structure 511 as shown. The spring 510 in the rolled configuration 140 can define the void 120 and the axis 122 (shown in FIG. 1) extending through the void 120. Example aspects of the void 120 can be concentric to the void 556 of the pipe 550. The sealing layer 130 can form the sleeve 131 and can wrap around the circumference of the spring 510, engaging the outer surface 314 (shown in FIG. 3) of the spring 510. As shown in the present aspect, portions of the spring 510 can extend beyond the sealing layer 130, such that the sealing layer 130 covers only a portion of the outer surface 314 of the spring 510. In other aspects, the sealing layer 130 can completely cover the outer surface 314 of the spring 510. In still other aspects, the sealing layer 130 may not extend around the entire circumference of the spring 510. In the present aspect, the sealing layer 130 is coupled to the spring 510 by zip ties 560. The zip ties 560 can be looped through spring loops 526 formed on the spring 510 and can engage the material of the sealing layer 130 to secure the sealing layer 130 to the spring 510. In other aspects, however, a fastener other than the zip ties 560 can be used to attach the sealing layer 130 to the spring 510, such as, for example, sewing or an adhesive.

As shown, example aspects of the spring 510 can further comprise one or more tabs 528 extending inward towards the void 120. Each of the tabs 528 can define an opening therethrough. In example aspects, a cable (not shown) can pass through the opening of each of the tabs 528 and can be tightened to contract the stent 100 to the compressed configuration through tension in the cable. The cable can be cut to release the contracting force on the stent 100 and to allow the spring 510 to bias the stent 100 to the expanded configuration 102. In other aspects, the stent 100 can be compressed by another compression or contraction mechanism, such as a compression sleeve, a dissolvable wire, or any other suitable mechanisms known in the art. In an aspect comprising a dissolvable wire, the wire can be dissolved by electricity, chemicals, water, or any other suitable dissolving mechanism. In still another aspect, the compression mechanism can be a hose clamp. In some aspects, the hose clamp or other compression mechanism can comprise a worm drive.

With the stent 100 in the expanded configuration 102 within the pipe 550, the outer surface 132 of the sealing layer 130 (shown in FIG. 1) can press against the inner wall 552 of the pipe 550 to retain the stent 100 in position relative the pipe 550. Furthermore, the sealing layer 130 can press against a crack 554 in the pipe 550, or other damage to the pipe 550, to seal the crack 554 and prevent leakage at the crack 554.

Figure 6:
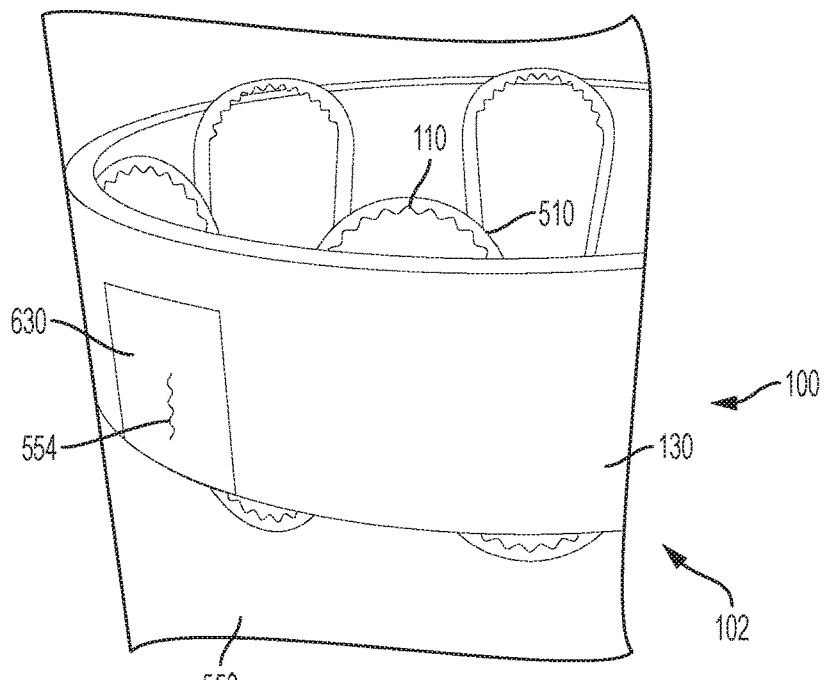
FIG. 6 is a perspective view of the stent of FIG. 5 in the expanded configuration within the pipe of FIG. 5, the stent comprising a second sealing layer.

FIG. 6 illustrates the stent 100 of FIG. 5 with a secondary sealing layer 630. The secondary sealing layer 630 can be formed from the same material as the sealing layer 130, or can be formed from a different material. For example, in one aspect, the sealing layer 130 can be formed from neoprene and the secondary sealing layer 630 can be formed from an epoxy. Other aspects of the sealing layer 130 and secondary sealing layer 630 can be formed from other materials. In example aspects, the secondary sealing layer 630 can be provided for improved sealing capability at the site of the crack 554 or other damage. For example, the sealing layer 130 can serve as a general sealing solution and can provide support to the secondary sealing layer 630, while the secondary sealing layer 630 can serve as a more acute sealing solution. In some example aspects, the secondary sealing layer 630 can comprise a compliant material that can be pressed into the crack 554 or other damage. Furthermore, in some aspects, the sealing layer 130 can comprise a less compliant material configured to provide structure to the stent and support to the secondary sealing layer.

An example aspect of a method for using the stent 100 is also disclosed. A compression force (or contraction force in some instances) can be applied to the stent 100 to orient the stent 100 in the compressed configuration 204, wherein the stent 100 has a reduced stent diameter as compared to the stent diameter in the expanded configuration 102. In one aspect, the compression force can be applied by a compression sleeve (not shown) having a smaller diameter than the stent diameter in the expanded configuration 102. In other aspects, the compression force can be applied by cables, ties, or another suitable compression mechanism.

In the compressed configuration 204, the reduced stent diameter and reduced stent volume can allow for easy insertion of the stent 100 into the pipeline (not shown) and navigation through the pipeline. The pipeline can comprise one or more pipes, such as the pipe 550 shown in FIG. 5. According to example aspects, the pipeline can transport a fluid along the pipeline, such as, for example, water, oil, or natural gas. The stent 100 can be inserted into the pipeline in the compressed configuration 204 at an existing access point. In an example aspect, the existing access point can be a fire hydrant. In other aspects, the existing access point can be the entrance or exit of the pipeline, a service entrance, or another suitable point of entry that allows for easy insertion of the stent 100 into the pipeline.

Once inserted into the pipeline, the stent 100 can be mechanically driven or motor-driven through the pipeline to the location of the crack 554 or other damage. In instances where the stent 100 is moving through the pipeline in the direction of the fluid flow, a current of the fluid can assist in moving the stent 100 through the pipeline. As the stent 100 moves through the pipeline, fluid in the pipeline can continue to flow around and/or through the compressed stent 100. As such, the flow of fluid in the pipeline can continue uninterrupted as the stent 100 is navigated through the pipeline. Such a configuration prevents the need to shut off the fluid flow during repairs, which can save costs for the service provider and prevent interruption of service to customers. Furthermore, inserting the stent 100 into the pipeline at an existing access point and remotely navigating the stent 100 through the pipeline can eliminate the need to dig up the surrounding terrain to access the damaged pipe, which can save time and costs when performing repairs.

The compressed stent 100 can be positioned in the pipeline proximate to the crack 554 in the pipe 550. The compression force applied to the stent 100 by the compression sleeve, or other compression mechanism, can be removed or reduced, such that the spring force can bias the stent 100 to the expanded configuration 102. In the expanded configuration 102, the outer surface 132 of the sealing layer 130 of the stent 100 can contact the inner wall 552 of the pipe 550 and can press against the crack 554 to create a watertight seal and prevent leakage at the crack location. In some aspects, a portion of the sealing layer 130 can be pushed into the crack 554 for an improved seal. In example aspects, fluid pressure from the fluid flow in the pipeline can also assist in biasing the stent 100 against the inner wall 552 of the pipe 550.

With the stent 100 positioned in the pipe 550 in the expanded configuration 102, fluid in the pipeline can flow through the void 120 in the stent 100. Example aspects of the stent 100 can be sized and shaped to fit tightly in the pipeline in the expanded configuration 102. For example, in one aspect, the stent diameter in the fully expanded configuration 102 can be slightly greater than a diameter of the inner wall 552 of the pipe 550. The tight fit of the stent 100 within the pipe 550, along with fluid pressure against the stent 100, can aid in retaining the stent 100 in position at the location of the crack 554 or other damage. In some aspects, the stent 100 in the expanded configuration 102 can also serve to add structural integrity to the pipe 550. In such aspects, the stent 100 can be formed from materials of a sufficient strength and can be provided with a sufficient spring force for providing structural support to the pipe 550 at the location of the stent 100. Some aspects of the stent 100 further can include a fastener for attaching the stent 100 to the inner wall 552 of the pipe 550, such as, for example, an adhesive. However, in other aspects, any other suitable fastener known in the art can be used to attach the stent 100 to the pipe 550.

Figure 7:
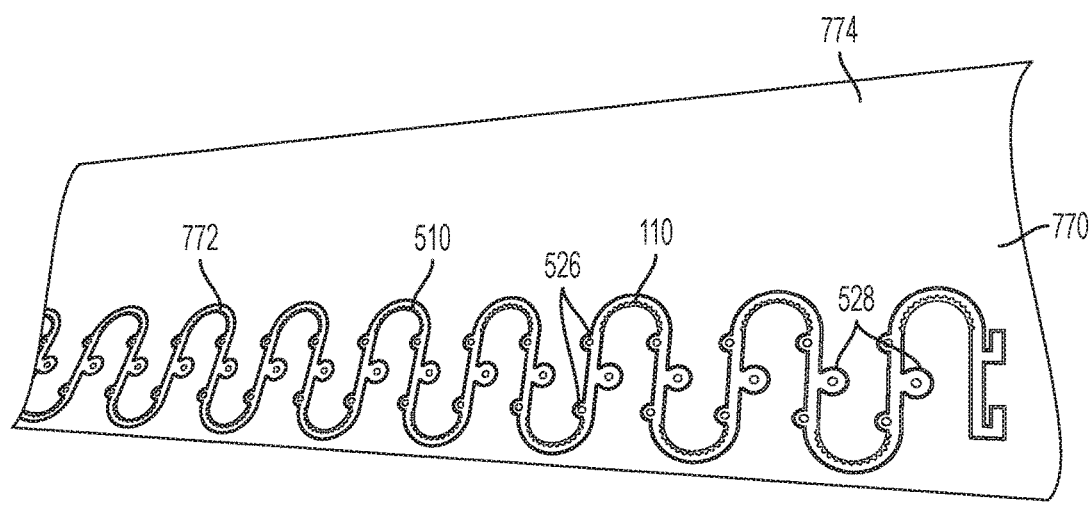
FIG. 7 is a perspective view of a spring of the stent of FIG. 5 formed in a piece of sheet material.

Example aspects of the spring 110 can be cut from a sheet 770 of material. Referring to FIG. 7, the spring 510 of FIG. 5 can be cut from a flat sheet 770 of metal material, such as, for example, stainless steel. Other aspects of the spring 510 can be formed from a sheet 770 of another material, such as spring steel, aluminum, plastic, nitinol, or any other suitable material in sheet form. A pattern of the spring 510, such as the wave pattern 772 depicted, can be etched, stamped, or otherwise cut into the sheet 770, and any excess sheet material 774 can be removed.

In another aspect, the spring 110 can be formed from a wire (not shown) and worked into the wave-pattern shape of the wave-pattern spring 510. For example, the wire can be hot worked or cold worked into the wave-pattern shape. In other aspects, the wire can be worked into another desired spring shape. Furthermore, in example aspects, after working the wire into the desired shape, the spring 110 can be heat treated to allow the spring 110 to retain a spring temper.

Figure 8:
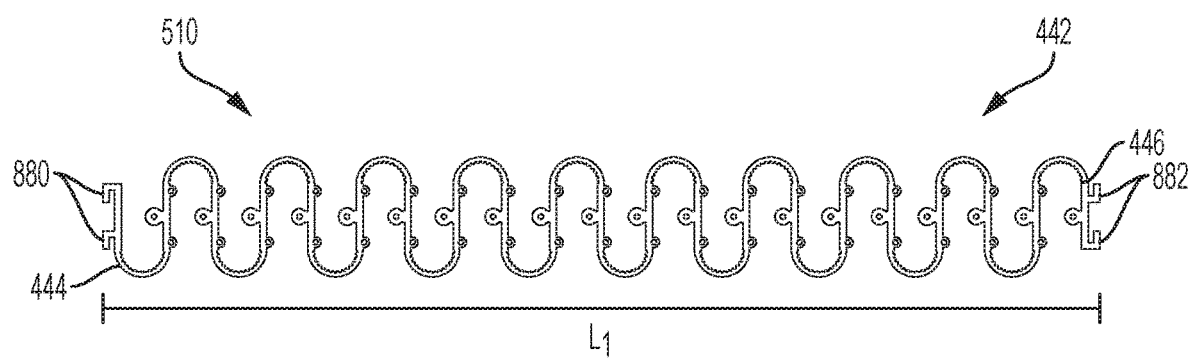
FIG. 8 is a front view of the spring of the stent of FIG. 5 in an unrolled configuration.

FIG. 8 illustrates the spring 510 in the unrolled configuration 442 with the excess sheet material 774 removed. As shown, the spring 510 can define the first end 444 and the opposite second end 446. The first end 444 can define a pair of L-shaped hooks 880 extending downwardly therefrom, relative to the orientation shown. The second end 446 can define a pair of mating L-shaped hooks 882 extending upwardly therefrom, relative to the orientation shown. The spring 510 can be rolled to define the tubular structure 511 shown in FIG. 5, and the hooks 880 at the first end 444 can engage the mating hooks 882 at the second end 446 to retain the spring 510 in the rolled configuration 140.

Figure 9:
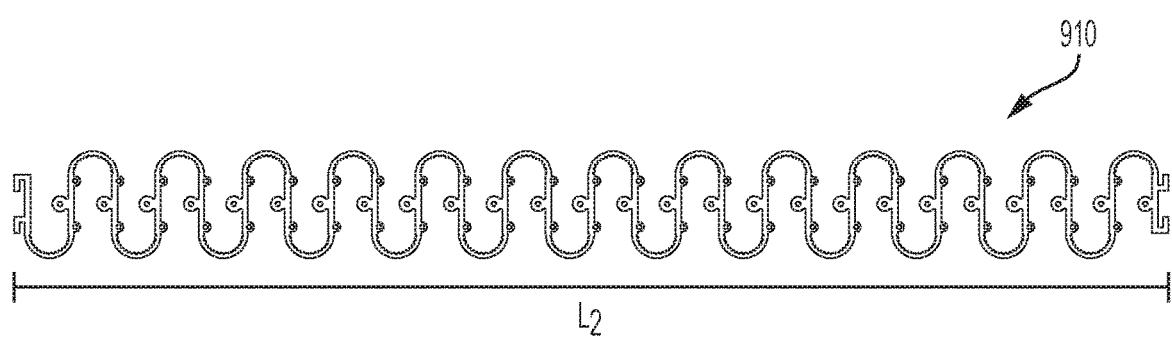
FIG. 9 is another aspect of a spring according to the present disclosure in an unrolled configuration.

FIG. 9 illustrates another aspect of the spring 110. In this aspect, the spring 110 can be a wave pattern spring 910 substantially similar to the spring 510 of FIGS. 5-8; however, the spring 910 can define a length $L_2$ greater than a length $L_1$ (shown in FIG. 8) of the spring 510. For example, in one aspect, the spring 510 can define a length $L_1$ of between about 5 inches and 7 inches, and in other aspects, the spring 510 can define a length $L_1$ of about 6 inches. Furthermore, in one aspect, the spring 910 can define a length $L_2$ of between about 7 inches and 9 inches, and in other aspects, the spring 910 can define a length $L_2$ of about 8 inches. In other aspects, the lengths $L_1$, $L_2$ of the springs 510,910, respectively, can be greater or less than the example aspects described, and this disclosure should not be viewed as limiting.

Figure 10:
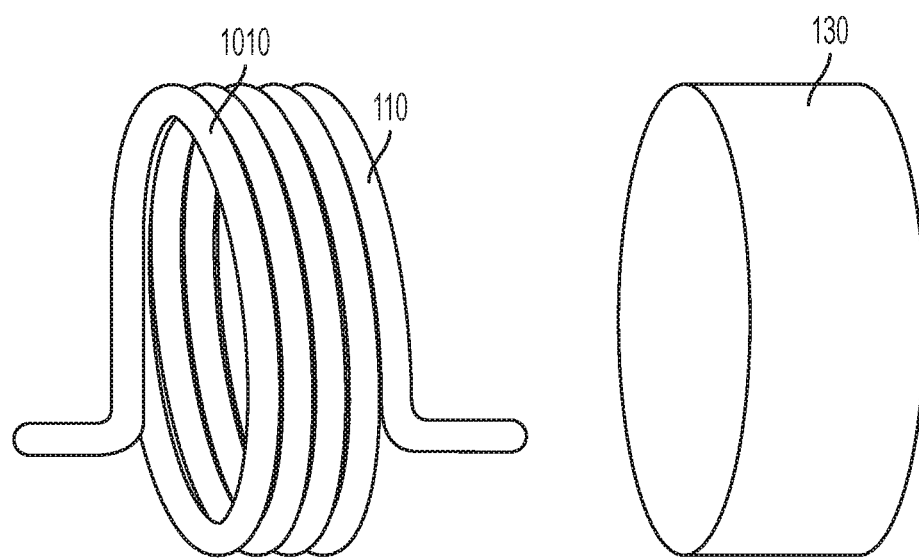
FIG. 10 is an exploded view of another aspect of the stent according to the present disclosure.

FIG. 10 illustrates an exploded view of another aspect of the stent 100. As shown, the stent 100 can comprise the spring 110 and the sealing layer 130. In the present aspect, the spring 110 can be a torsion spring 1010. In the compressed configuration, a twisting force can be applied to the torsion spring 1010, such that a diameter of the torsion spring 1010 and the overall stent diameter can be reduced. In the expanded configuration, the twisting force can be removed and the torsion spring 1010 can spring radially outward, biasing the sealing layer 130 radially outward against the inner wall 552 of the pipe 550 (shown in FIG. 5).

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A stent for repairing a pipe comprising:
   a spring comprising a metal wire and defining a tubular structure, the spring defining an outer surface and an inner surface, the inner surface defining a void, an axis extending through the void, and wherein the metal wire of the spring defines a wave pattern which undulates axially relative to the axis; and
   a sealing layer defining a sleeve, the sealing layer wrapped around a circumference of the spring and engaging the outer surface of the spring;
   the stent configurable in a compressed configuration, wherein the spring is compressed, and an expanded configuration, wherein the spring is expanded.

2. The stent of claim 1, wherein the spring is configurable in a rolled configuration and an unrolled configuration.

3. The stent of claim 1, further comprising a fastener coupling the sealing layer to the spring.

4. The stent of claim 3, wherein the fastener is a zip tie.

5. The stent of claim 3, wherein:
   the spring further comprises a spring loop; and
   the fastener extends through the spring loop and engages the sealing layer to couple the sealing layer to the spring.

6. The stent of claim 1, wherein the spring further comprises a plurality of tabs extending radially inward towards the void, each of the tabs defining an opening.

7. The stent of claim 6, further comprising a compression mechanism extending through each of the openings, the compression mechanism contracting the stent to the compressed configuration.

8. The stent of claim 1, further comprising a secondary sealing layer.

9. The stent of claim 1, wherein an expansion ratio of a diameter of the stent in the expanded configuration to a diameter of the stent in the compressed configuration is between 1.2/1 and 3/1.

10. The stent of claim 1, wherein the metal wire is formed from a sheet of metal.

11. A method for repairing a pipe comprising:
    providing a stent comprising a spring and a sealing layer, the stent configurable in an expanded configuration and a compressed configuration, wherein an expansion ratio of a diameter of the stent in the expanded configuration to a diameter of the stent in the compressed configuration is between 1.2/1 and 3/1;
    applying a compression force to the stent to orient the stent in the compressed configuration, which comprises engaging a compression mechanism with a tab of the stent and contracting the stent radially inward with the compression mechanism;
    navigating the stent to a crack in a pipe;
    removing the compression force from the stent;
    expanding the stent to the expanded configuration within the pipe; and
    engaging an outer surface of the sealing layer with an inner wall of the pipe.

12. The method of claim 11, wherein the compression mechanism extends through an opening in the tab.

13. The method of claim 11, wherein navigating the stent to a crack in the pipe comprises inserting the stent into a pipeline at an existing access point of the pipeline and driving the stent through the pipeline to a location of the crack.

14. The method of claim 11, wherein expanding the stent to the expanded configuration within the pipe comprising biasing the sealing layer radially outward by a spring force of the spring.

15. The method of claim 11, wherein engaging an outer surface of the sealing layer with an inner wall of the pipe comprises pressing the outer surface of the sealing layer against the crack to form a watertight seal between the sealing layer and the inner wall and prevent leakage at the crack.

16. The method of claim 11, wherein the stent further comprises a fastener coupling the sealing layer to the spring.

17. The method of claim 11, wherein the spring comprises a metal wire formed from a sheet of metal.

18. The method of claim 17, wherein the metal wire defines a wave pattern in an axial direction.

19. A stent for repairing a pipe comprising:
   a spring comprising a metal wire and defining a tubular structure, the spring defining an outer surface and an inner surface, the spring comprising a spring loop, the inner surface defining a void, an axis extending through the void;
   a sealing layer defining a sleeve, the sealing layer wrapped around a circumference of the spring and engaging the outer surface of the spring; and
   a fastener coupling the sealing layer to the spring, the fastener extending through the spring loop and engaging the sealing layer;
   the stent configurable in a compressed configuration, wherein the spring is compressed, and an expanded configuration, wherein the spring is expanded.

20. A stent for repairing a pipe comprising:
   a spring comprising a metal wire and defining a tubular structure, the spring defining an outer surface and an inner surface, the inner surface defining a void, an axis extending through the void, the spring further comprises a plurality of tabs extending radially inward towards the void, each of the tabs defining an opening; and
   a sealing layer defining a sleeve, the sealing layer wrapped around a circumference of the spring and engaging the outer surface of the spring;
   the stent configurable in a compressed configuration, wherein the spring is compressed, and an expanded configuration, wherein the spring is expanded.

21. The stent of claim 20, further comprising a compression mechanism extending through each of the openings, the compression mechanism contracting the stent to the compressed configuration.

* * * * *